United States Patent
Bancroft

(10) Patent No.: US 11,835,159 B2
(45) Date of Patent: Dec. 5, 2023

(54) PREASSEMBLED COUPLING HAVING A SEAL

(71) Applicant: Victaulic Company, Easton, PA (US)

(72) Inventor: Philip Wayne Bancroft, Belvidere, NJ (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

(21) Appl. No.: 18/096,135

(22) Filed: Jan. 12, 2023

(65) Prior Publication Data

US 2023/0167928 A1    Jun. 1, 2023

Related U.S. Application Data

(60) Continuation of application No. 17/498,309, filed on Oct. 11, 2021, now Pat. No. 11,739,867, which is a division of application No. 15/994,299, filed on May 31, 2018, now Pat. No. 11,168,816.

(60) Provisional application No. 62/514,229, filed on Jun. 2, 2017.

(51) Int. Cl.
F16L 17/04    (2006.01)
F16L 21/06    (2006.01)

(52) U.S. Cl.
CPC .............. *F16L 17/04* (2013.01); *F16L 21/065* (2013.01)

(58) Field of Classification Search
CPC ......... F16L 17/04; F16L 21/065; F16L 23/08; F16L 21/005; F16L 25/12; F16L 25/14; F16L 21/06
See application file for complete search history.

(56) References Cited

U.S. PATENT DOCUMENTS

| | | |
|---|---|---|
| 1,541,601 A | 6/1925 | Tribe |
| 1,805,666 A | 5/1931 | Hukill |
| 1,808,262 A | 6/1931 | Hele-Shaw |
| 1,821,867 A | 9/1931 | Wilson |
| 1,867,891 A | 7/1932 | Reynolds |
| 1,994,361 A | 3/1935 | Johnson |
| 2,028,182 A | 1/1936 | Barnickol, Jr. |
| 2,507,261 A | 5/1950 | Mercier |
| 2,687,906 A | 8/1954 | Schnell |
| 3,004,780 A | 10/1961 | Main |
| 3,062,565 A | 11/1962 | Word, Jr. |
| 3,134,612 A | 5/1964 | Glasgow |
| 3,403,931 A | 10/1968 | Crain et al. |

(Continued)

FOREIGN PATENT DOCUMENTS

| | | |
|---|---|---|
| CN | 102656397 A | 9/2012 |
| CN | 103363207 A | 10/2013 |

(Continued)

*Primary Examiner* — Lee A Holly
(74) *Attorney, Agent, or Firm* — Ballard Spahr LLP

(57) ABSTRACT

A preassembled coupling for joining pipe elements has segments surrounding a central space with cusps which engage lobes of a seal to maintain the segments in spaced apart relation in a preassembled state. While the coupling is in the preassembled state the pipe elements may be inserted into the central space without disassembling the coupling, and portions of the seal adjacent to attachment members on the segments seat within a channel defined by the segments between the cusps, while portions of the seal between the attachment members are further from a back surface of the channel.

20 Claims, 6 Drawing Sheets

(56) References Cited

U.S. PATENT DOCUMENTS

| | | |
|---|---|---|
| 4,189,172 A | 2/1980 | Perrin |
| 4,350,350 A | 9/1982 | Blakeley |
| 4,480,861 A | 11/1984 | Cann, Jr. |
| 4,629,217 A | 12/1986 | Straub |
| 4,726,611 A | 2/1988 | Sauer |
| 4,779,903 A | 10/1988 | Maier et al. |
| 5,058,931 A | 10/1991 | Bowsher |
| 5,476,292 A | 12/1995 | Harper |
| 7,086,131 B2 | 8/2006 | Gibb et al. |
| 7,341,287 B2 | 3/2008 | Gibb et al. |
| 7,472,911 B2 | 1/2009 | Sun et al. |
| 8,038,176 B2 | 10/2011 | Bowman et al. |
| 8,069,547 B2 | 12/2011 | Gibb et al. |
| 8,282,136 B2 | 10/2012 | Vandal et al. |
| 8,424,918 B2 | 4/2013 | Gibb et al. |
| 8,556,302 B2 | 10/2013 | Dole |
| 8,628,122 B2 | 1/2014 | Kozal |
| 8,819,914 B2 | 9/2014 | Porter et al. |
| 9,726,310 B2 | 8/2017 | Gibb et al. |
| 9,958,095 B2 | 5/2018 | Blease et al. |
| 10,036,493 B2 | 7/2018 | Vandal et al. |
| 2003/0062718 A1 | 4/2003 | Radzik |
| 2005/0253029 A1 | 11/2005 | Gibb et al. |
| 2005/0253380 A1 | 11/2005 | Gibb et al. |
| 2008/0129048 A1 | 6/2008 | Nagle et al. |
| 2009/0146417 A1 | 6/2009 | Lippka et al. |
| 2010/0001521 A1 | 1/2010 | Vandal et al. |
| 2013/0185919 A1 | 7/2013 | Beagen, Jr. |
| 2013/0257045 A1* | 10/2013 | Mikami ............... F16L 17/04 |
| | | 285/364 |
| 2014/0246852 A1 | 9/2014 | Gibb et al. |
| 2014/0327238 A1 | 11/2014 | Bowman |
| 2016/0076681 A1 | 3/2016 | Blease et al. |
| 2016/0327192 A1 | 11/2016 | Lippka |
| 2018/0163905 A1 | 6/2018 | Ohnemus et al. |
| 2018/0163906 A1 | 6/2018 | Ohnemus et al. |

FOREIGN PATENT DOCUMENTS

| | | |
|---|---|---|
| EP | 0396952 A1 | 11/1990 |
| GB | 2121133 A | 12/1983 |
| JP | 2013210043 A | 10/2013 |
| WO | 2010002695 A2 | 1/2010 |
| WO | 2011056512 A1 | 5/2011 |

* cited by examiner

FIG. 2
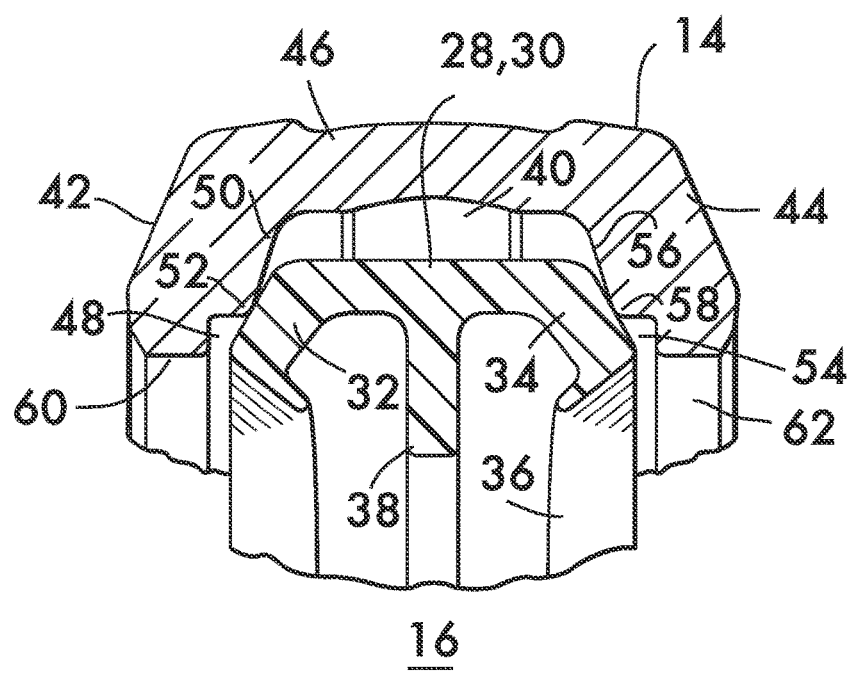
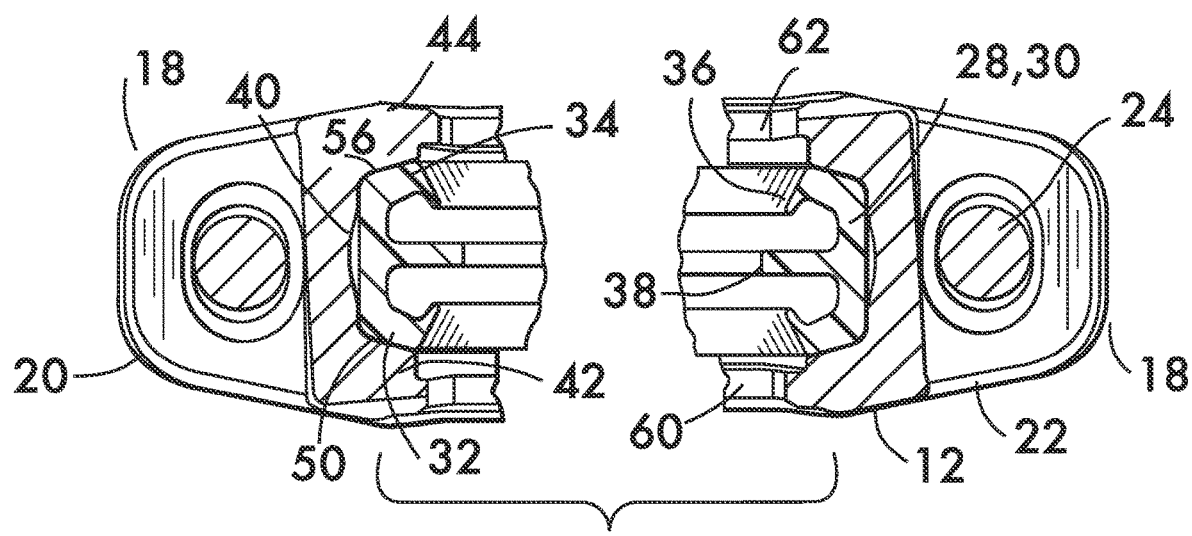
FIG. 3

PREASSEMBLED COUPLING HAVING A SEAL

CROSS REFERENCE TO RELATED APPLICATIONS

This application is a continuation of U.S. patent application Ser. No. 17/498,309, filed Oct. 11, 2021, which application is a divisional of U.S. patent application Ser. No. 15/994,299, filed May 31, 2018, now issued as U.S. Pat. No. 11,168,816, issued Nov. 9, 2021, which application is based upon and claims benefit of priority to U.S. Provisional Application No. 62/514,229, filed Jun. 2, 2017, all applications being hereby incorporated by reference herein.

FIELD OF THE INVENTION

This invention relates to mechanical couplings and seals for joining pipe elements.

BACKGROUND

One form of mechanical pipe coupling comprises segments attached to one another end to end surrounding a central space. A seal, for example a ring seal formed of an elastomeric material, is captured between the segments. The segments are attached end to end using adjustable attachment members, for example, lugs positioned at each end of each segment which receive fasteners joining the ends. Examples of such couplings are disclosed in U.S. Pat. No. 7,712,796. The segments surround and engage the ends of pipe elements to form a mechanical joint, and the seal is compressed between the segments and the pipe elements to ensure fluid tightness.

It is advantageous to support the segments in spaced apart relation sufficient to permit pipe elements to be inserted into the central space defined by the segments while the segments are held together by the fasteners. This "preassembled state" of the coupling promotes rapid formation of the joint as the coupling need not be disassembled and reassembled when connecting the pipe elements. Prior art couplings support the segments in the preassembled state on the outer circumference of the ring seal. However, there are opportunities to achieve a more compact coupling design where the segments are still supported on the seal in spaced relation sufficient to permit pipe elements to be inserted into the central space.

SUMMARY

The invention concerns a coupling for joining pipe elements in end to end relation. In one example embodiment the coupling comprises first and second segments attached to one another end to end and surrounding a central space. Each of the segments has a channel extending circumferentially around and facing the central space. Each of the channels is defined by first and second shoulders located on opposite sides of the segments and a back surface extending between the shoulders. Each shoulder comprises a first surface facing the central space and a second surface oriented at an angle with respect to the first surface. The first and second surfaces of the first shoulder meet at a first cusp, and the first and second surfaces of the second shoulder meet at a second cusp.

A seal is positioned within the central space. In this example embodiment the seal comprises a ring having first and second lobes positioned on opposite sides thereof. First and second attachment members are positioned at opposite ends of each of the segments, attaching the segments to one another. The attachment members are adjustably tightenable for drawing the segments toward one another. Contact between the first cusp and the first lobe and the second cusp and the second lobe between the first and second attachment members on each segment maintain the first and second segments in spaced relation sufficient to permit insertion of the pipe elements into the central space. The ring is closer to the back surface at points proximate to the first and second attachment members than at points on the segments between and distal to the first and second attachment members.

In an example coupling embodiment according to the invention, the first and second lobes contact the second surfaces of the first and second shoulders adjacent to the first and second attachment members when the first and second segments are in the spaced relation. Further by way of example, the ring may contact the back surface adjacent to the first and second attachment members when the first and second segments are in the spaced relation.

An example coupling further comprises first and second arcuate projections arranged on opposite sides of each of the first and second segments. The first projections extend from the first shoulders on the first and second segments, and the second projections extend from the second shoulders of the first and second segments. In an example embodiment, the first arcuate projections have a greater radius of curvature than the second arcuate projections.

The invention also encompasses, in combination, a pair of pipe elements and a coupling for joining the pipe elements in end to end relation. In this example embodiment the coupling comprises first and second segments attached to one another end to end and surrounding a central space. Each of the segments has a channel extending circumferentially around and facing the central space. Each of the channels is defined by first and second shoulders located on opposite sides of the segments and a back surface extending between the shoulders. In this example each shoulder comprises a first surface facing the central space and a second surface oriented at an angle with respect to the first surface. The first and second surfaces of the first shoulder meet at a first cusp, and the first and second surfaces of the second shoulder meet at a second cusp. A seal is positioned within the central space. In this example the seal comprises a ring having first and second lobes positioned on opposite sides thereof. First and second attachment members are positioned at opposite ends of each of the segments attaching the segments to one another. The attachment members are adjustably tightenable for drawing the segments toward one another. Contact between the first cusp and the first lobe and the second cusp and the second lobe between the first and second attachment members on each segment maintain the first and second segments in spaced relation sufficient to permit insertion of the pipe elements into the central space. The ring is closer to the back surface at points proximate to the first and second attachment members than at points on the segments between and distal to the first and second attachment members.

By way of example, the first and second lobes may contact the second surfaces of the first and second shoulders adjacent to the first and second attachment members when the first and second segments are in the spaced relation. In a further example, the ring may contact the back surface adjacent to the first and second attachment members when the first and second segments are in the spaced relation.

In an example embodiment, first and second arcuate projections are arranged on opposite sides of each of the first and second segments. The first projections extend from the first shoulders on the first and second segments, and the second projections extending from the second shoulders of the first and second segments. In an example embodiment, the first arcuate projections have a greater radius of curvature than the second arcuate projections.

The invention further contemplates a coupling for joining pipe elements in end to end relation wherein the coupling comprises first and second segments attached to one another end to end and surrounding a central space. Each of the segments has a channel extending circumferentially around and facing the central space. Each of the channels is defined by first and second shoulders located on opposite sides of the segments and a back surface extending between the shoulders. Each shoulder comprises a first surface facing the central space and a second surface oriented at an angle with respect to the first surface. The first and second surfaces of the first shoulder meet at a first cusp, and the first and second surfaces of the second shoulder meet at a second cusp. A seal is positioned within the central space. The seal comprises a ring having first and second lobes positioned on opposite sides thereof. First and second attachment members are positioned at opposite ends of each of the segments attaching the segments to one another. In this example embodiment, at least one of the attachment members is adjustably tightenable for drawing the segments toward one another. Contact between the first cusp and the first lobe and the second cusp and the second lobe between the first and second attachment members on each segment maintains the first and second segments in spaced relation sufficient to permit insertion of the pipe elements into the central space. The ring is closer to the back surface at points proximate to the first and second attachment members than at points on the segments between and distal to the first and second attachment members.

Further by way of example, the first and second lobes may contact the second surfaces of the first and second shoulders adjacent to the first and second attachment members when the first and second segments are in the spaced relation. Also by way of example, the ring may contact the back surface adjacent to the first and second attachment members when the first and second segments are in the spaced relation.

In an example embodiment, first and second arcuate projections are arranged on opposite sides of each of the first and second segments. The first projections extend from the first shoulders on the first and second segments, and the second projections extending from the second shoulders of the first and second segments. By way of example, the first arcuate projections may have a greater radius of curvature than the second arcuate projections.

The invention also includes, in combination, a pair of pipe elements and a coupling for joining the pipe elements in end to end relation. In an example embodiment the coupling comprises first and second segments attached to one another end to end and surrounding a central space. Each of the segments has a channel extending circumferentially around and facing the central space. Each of the channels is defined by first and second shoulders located on opposite sides of the segments and a back surface extending between the shoulders. Each shoulder comprises a first surface facing the central space and a second surface oriented at an angle with respect to the first surface. The first and second surfaces of the first shoulder meet at a first cusp, and the first and second surfaces of the second shoulder meeting at a second cusp. A seal is positioned within the central space. The seal comprises a ring having first and second lobes positioned on opposite sides thereof. First and second attachment members are positioned at opposite ends of each of the segments attaching the segments to one another. At least one of the attachment members is adjustably tightenable for drawing the segments toward one another. Contact between the first cusp and the first lobe and the second cusp and the second lobe between the first and second attachment members on each segment maintain the first and second segments in spaced relation sufficient to permit insertion of the pipe elements into the central space. The ring is closer to the back surface at points proximate to the first and second attachment members than at points on the segments between and distal to the first and second attachment members.

By way of example, the first and second lobes may contact the second surfaces of the first and second shoulders adjacent to the first and second attachment members when the first and second segments are in the spaced relation. In a further example, the ring may contact the back surface adjacent to the first and second attachment members when the first and second segments are in the spaced relation.

An example embodiment may further comprise first and second arcuate projections arranged on opposite sides of each of the first and second segments. The first projections extend from the first shoulders on the first and second segments, and the second projections extend from the second shoulders of the first and second segments. In an example embodiment, the first arcuate projections have a greater radius of curvature than the second arcuate projections.

BRIEF DESCRIPTION OF THE DRAWINGS

FIG. 2 is a sectional view taken at line 2-2 of FIG. 1;
FIG. 3 is a sectional view taken at line 3-3 of FIG. 1.

DETAILED DESCRIPTION

Figure 1:
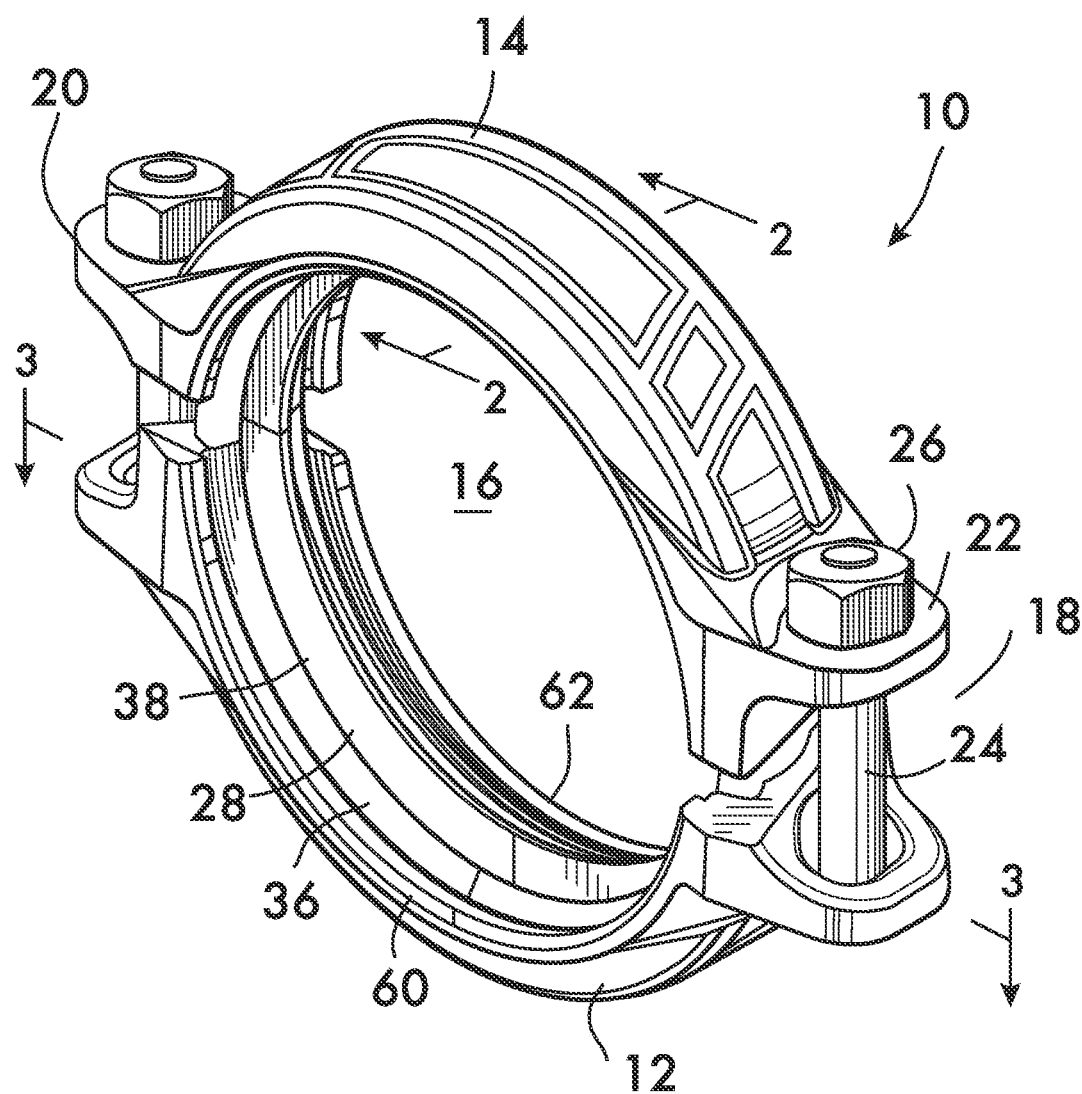
FIG. 1 is an isometric view of an example coupling according to the invention shown in a preassembled state.

FIG. 1 shows an example embodiment of a coupling 10 according to the invention. Example coupling 10 comprises first and second segments 12 and 14 attached to one another end to end and surrounding a central space 16. In this example attachment of the segments 12 and 14 to one another is effected by first and second adjustably tightenable attachment members 18 which comprise lugs 20, 22 positioned at opposite ends of each segment 12, 14. Lugs 20, 22 receive fasteners, such as bolts 24 and nuts 26 which draw the segments 12 and 14 toward one another when tightened. A seal 28 is positioned between the segments 12 and 14. As shown in FIG. 2, seal 28 comprises a ring 30 having first and second lobes 32 and 34 positioned on opposite sides of the ring. Lobes 32 and 34 extend circumferentially around the ring 30. A circumferentially extending sealing surface 36 is positioned at the end of each lobe 32, 34. Sealing surfaces 36 face the central space 16 and engage pipe elements to effect a fluid tight joint as explained below. A center leg 38 extends from ring 30 toward the central space 16. The center leg 38 extends circumferentially around the ring 30 and acts as a pipe stop to ensure that pipe elements are properly seated within the coupling as described below.

As shown in FIG. 2, each segment 12 and 14 (14 shown) comprises a channel 40 extending circumferentially around each segment, the channels 40 facing the central space 16. Each channel 40 is defined by first and second shoulders 42 and 44 and a back surface 46. Shoulders 42 and 44 are located on opposite sides of segments 12 and 14 and the back surface 46 extends between the shoulders. First shoulder 42 comprises a first surface 48 which faces the central space 16, and a second surface 50 oriented at an angle with respect to the first surface 48. The first and second surfaces 48, 50 meet at a first cusp 52. Second shoulder 44 comprises a first surface 54 which faces the central space 16, and a second surface 56 oriented at an angle with respect to the first surface 54. The first and second surfaces 54, 56 meet at a second cusp 58. In this example embodiment the first and second cusps 52, 58 are rounded, but other shapes are feasible. In this example coupling the segments 12 and 14 also comprise arcuate projections 60 and 62 arranged on opposite sides of each segment 12 and 14. The arcuate projections, also called "keys" engage circumferential grooves in the pipe elements to provide mechanical engagement as described below.

FIG. 1 shows the coupling 10 in the "preassembled state" wherein the segments 12 and 14 are supported on the seal 28 in spaced apart relation sufficient to permit pipe elements to be inserted into the central space 16 as described below. The fasteners (bolts 24, nuts 26) hold the segments 12 and 14 against the seal 28 in the preassembled state. As shown in FIG. 2, separation of the segments 12 and 14 in the preassembled state is maintained because the first and second cusps 52 and 58 respectively contact the first and second lobes 32 and 34 of the seal 28. Contact between the cusps 52, 58 and the lobes 32, 34 extends circumferentially over a substantial portion of the segments 12 and 14. As shown in FIG. 3, when the coupling 10 is in the preassembled state, portions of the seal 28 adjacent to the attachment members 18 seat within the channel 40, as evinced by deformation of the lobes 32 and 34 toward one another as the first lobe 32 contacts the first surface 50 of the first shoulder 42 and the second lobe 34 contacts the second surface 56 of the second shoulder 44. Contact between the first cusp 52 and the first lobe 32 and the second cusp 58 and the second lobe 34 between the first and second attachment members 20, 22 on each segment 12, 14 maintains the first and second segments in spaced relation sufficient to permit insertion of the pipe elements into the central space 16. As shown in a comparison of FIGS. 2 and 3, the ring 30 is closer to the back surface 46 at points proximate to the first and second attachment members 20, 22 than at points on the segments 12, 14 between and distal to the first and second attachment members 20 and 22. In the example shown, the first and second lobes 32, 34 contact the second surfaces 50 and 56 of the first and second shoulders 42, 44 adjacent to the first and second attachment members 20, 22 when the first and second segments 12 and 14 are in spaced relation. The ring 30 contacts the back surface 46 adjacent to the first and second attachment members 20 and 22 (see FIG. 3) when the first and second segments 12 and 14 are in spaced relation. However, the ring 30 is in spaced relation to the back surface 46 at points between the first and second attachment members 20, 22, as shown in FIG. 2.

Figure 4:
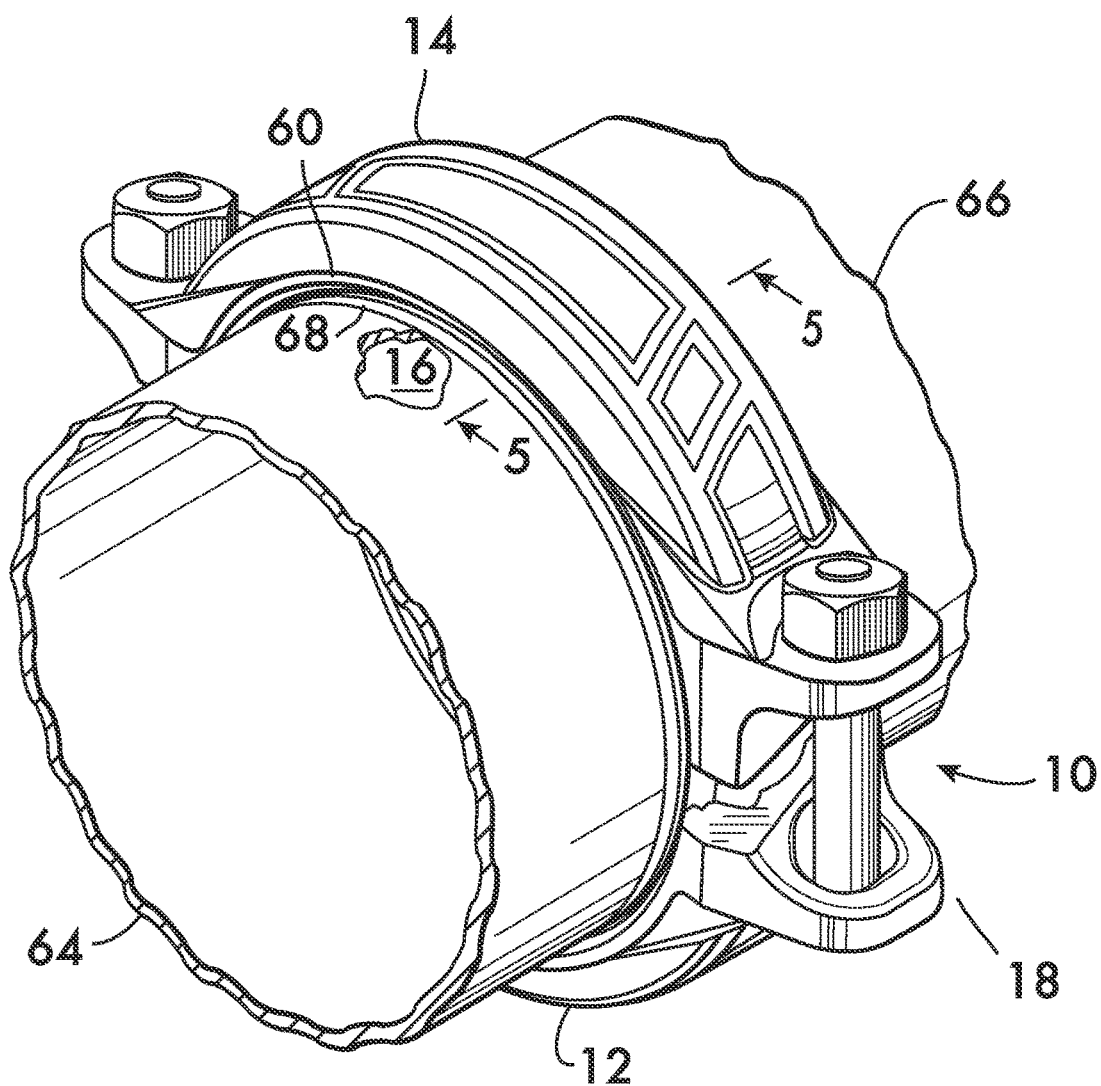
FIG. 4 is an isometric view of the coupling shown in FIG. 1 receiving pipe elements when in its preassembled state.
Figure 5:
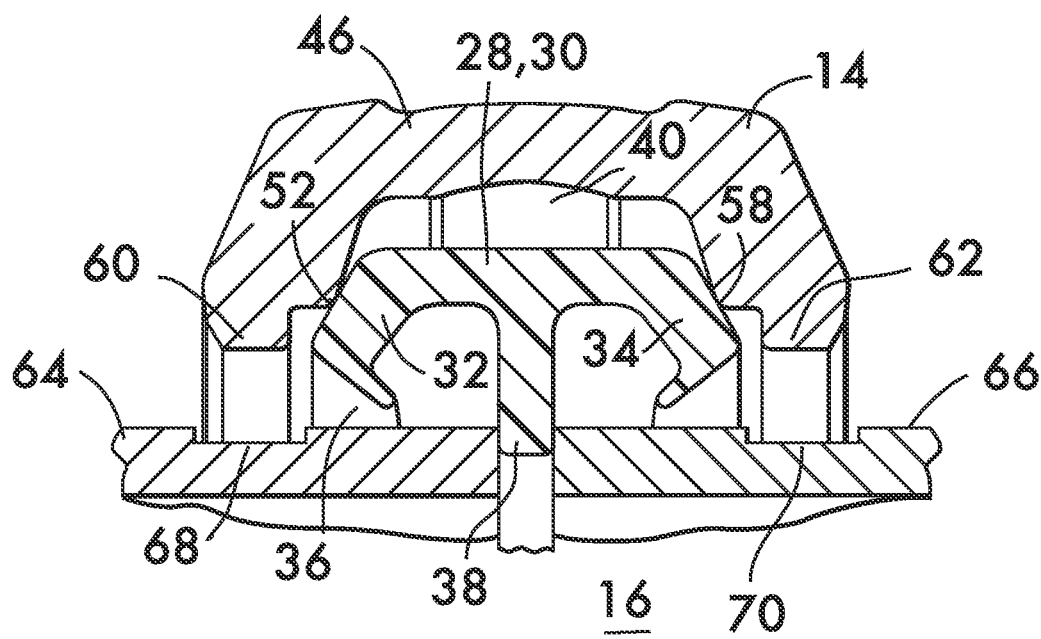
FIG. 5 is a sectional view taken at line 5-5 of FIG. 4.

FIGS. 4-7 illustrate use of the example coupling 10. As shown in FIG. 4, with the coupling 10 in the preassembled state pipe elements 64 and 66 are inserted into the central space 16 defined by the segments 12 and 14. Insertion is possible because the segments 12 and 14 are supported in spaced relation by contact between the cusps 52 and 58 and the lobes 32 and 34 as shown in FIG. 5. The pipe elements are inserted into the central space 16 to the extent that they contact the center leg 38 of the seal 28, which acts as a pipe stop. When the ends of the pipe elements 64 and 66 contact the center leg 38 each arcuate projection 60, 62 aligns with a respective circumferential groove 68, 70 in each pipe element.

Figure 7:
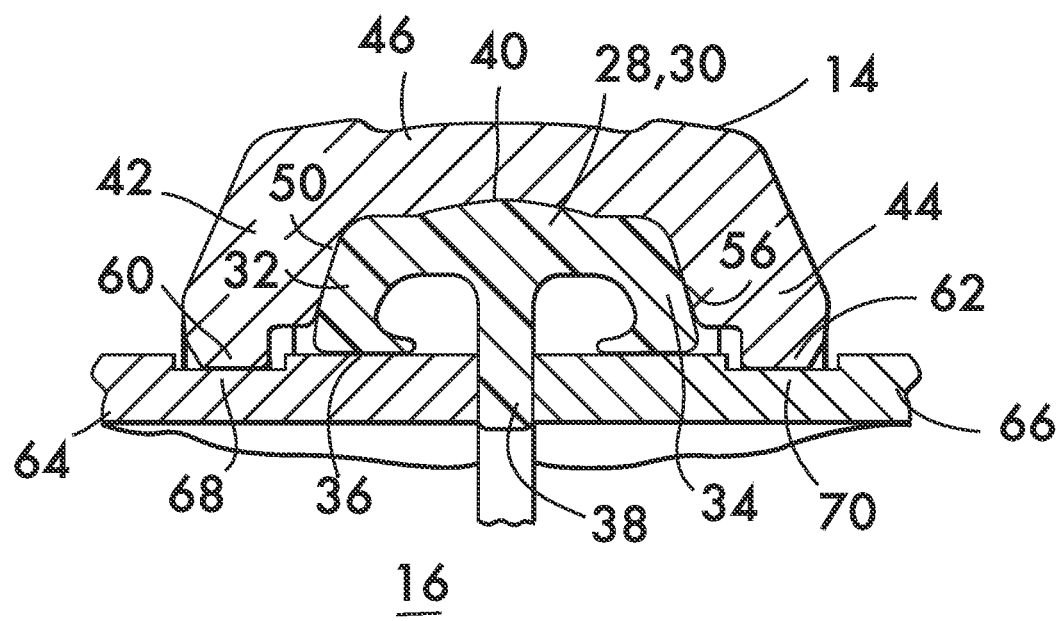
FIG. 7 is a sectional view taken at line 7-7 of FIG. 6.
Figure 6:
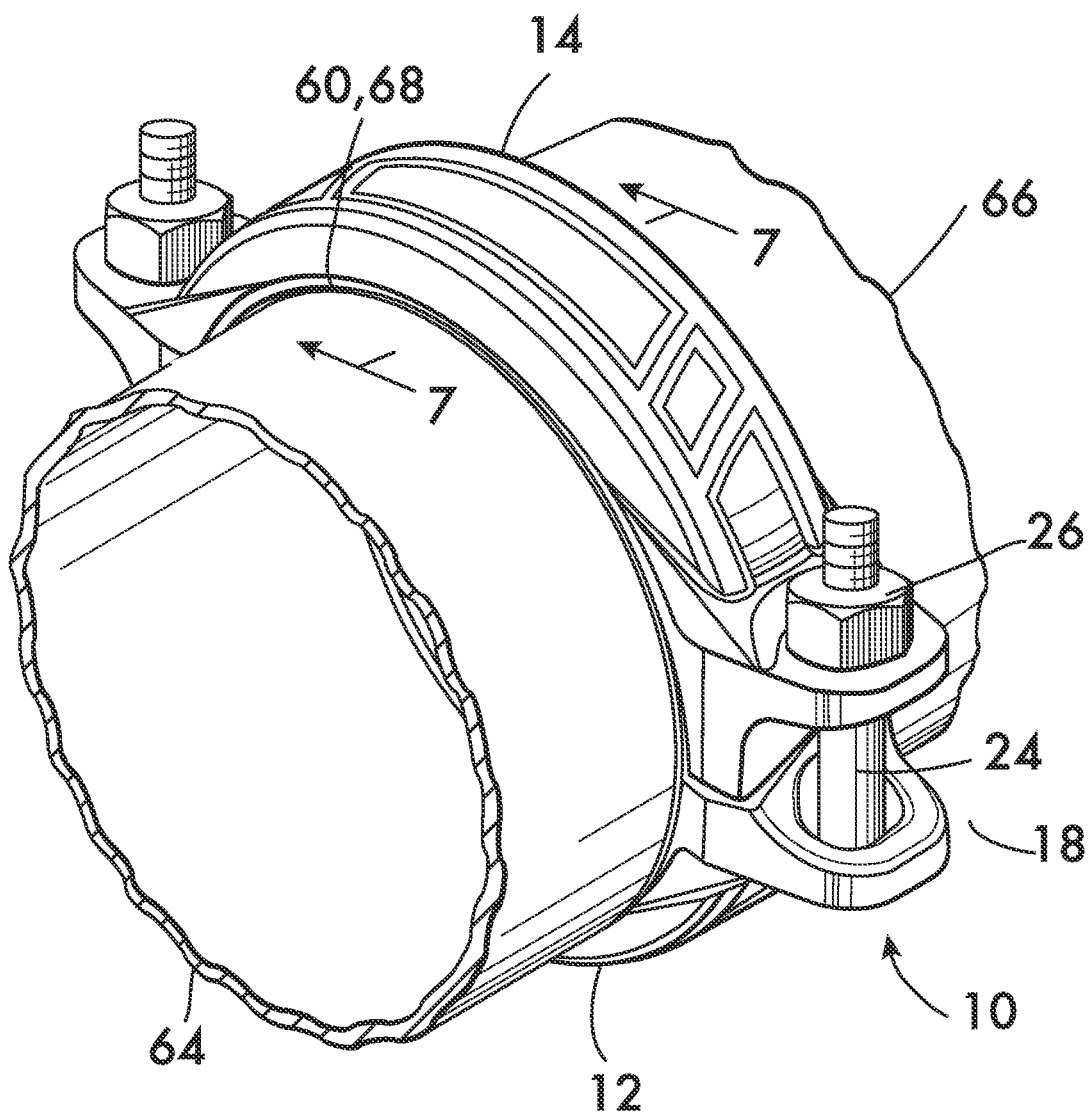
FIG. 6 is an isometric view of the coupling shown in FIG. 1 joining pipe elements.

Next, as shown in FIG. 6, the fasteners (bolts 24, nuts 26) are tightened and the segments 12 and 14 are drawn toward one another. As shown in FIG. 7 the seal 28 is thus compressed between the segments 12 and 14 and the pipe elements 64, 66 and deforms as it seats within channel 40 over the region between the attachment members 18 (see also FIG. 6). As the seal 28 deforms, the sealing surfaces 36 sealingly engage the pipe elements 64 and 66 and the lobes 32 and 34 move toward one another as they contact the second surfaces 50 and 56 of the first and second shoulders 42 and 44. As the seal 28 seats the center ring 30 moves toward and engages the back surfaces 46 of segments 12 and 14 (14 shown). As the segments 12 and 14 are further drawn toward one another the arcuate projections 60 and 62 engage their respective circumferential grooves 68 and 70 to effect a mechanical connection between the coupling 10 and the pipe elements 64 and 66.

Figure 8:
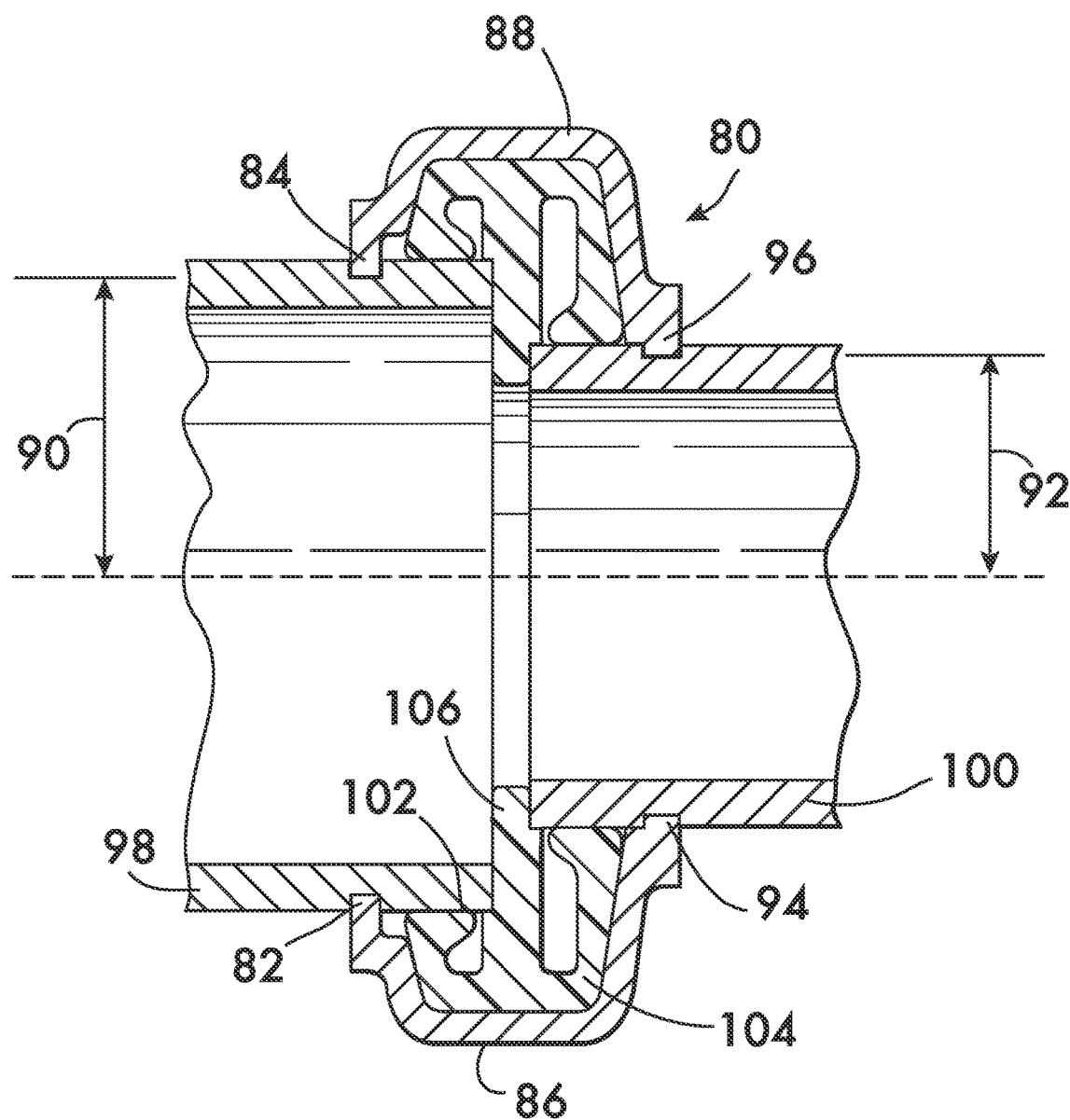
FIG. 8 is a longitudinal sectional view of another embodiment of a coupling according to the invention.

FIG. 8 shows another embodiment of a pipe coupling 80 according to the invention. Coupling 80 differs from the example embodiments described above in that the first arcuate projections on one side of segments 86 and 88 have a greater radius of curvature 90 than the radius of curvature 92 of the second arcuate projections 94 and 96 on the opposite side of segments 86 and 88. Coupling 80 is a "transition" coupling which permits larger diameter pipe elements 98 to be connected to smaller diameter pipe elements 100. FIG. 8 shows the lobes 102 of seal 102 deformed and forming a fluid tight seal between the pipe elements 98 and 100 and the coupling 80.

Using pipe couplings according to the invention, wherein the segments are supported in spaced relation in the preassembled state on the lobes of the seal, as opposed to the seal's outer circumference, allows a preassembled coupling to be formed with minimized ovality of the ring seal and permits greater separation of the segments for a given ring seal diameter.

What is claimed is:

1. A coupling for joining pipe elements in end to end relation, said coupling comprising:
   first and second segments attached to one another end to end and surrounding a central space, each of said segments having a channel extending circumferentially around and facing said central space, each of said channels being defined by first and second shoulders located on opposite sides of said segments and a back surface extending between said shoulders, each said shoulder comprising a first surface facing said central space and a second surface oriented at an angle with respect to said first surface, said first and second surfaces of said first shoulder meeting at a first cusp, said first and second surfaces of said second shoulder meeting at a second cusp;
   a seal positioned within said central space, said seal comprising a ring having first and second lobes positioned on opposite sides thereof;
   first and second attachment members positioned at opposite ends of each of said segments attaching said segments to one another, said attachment members being adjustably tightenable for drawing said segments toward one another; wherein contact between said first cusp and said first lobe and said second cusp and said second lobe between said first and second attachment members on each said segment maintaining said first and second segments in spaced relation sufficient to permit insertion of said pipe elements into said central space, said ring being closer to said back surface at points proximate to said first and second attachment members than at points on said segments between and distal to said first and second attachment members.

2. The coupling according to claim 1, wherein said first and second lobes contact said second surfaces of said first and second shoulders adjacent to said first and second attachment members when said first and second segments are in said spaced relation.

3. The coupling according to claim 2, wherein said ring contacts said back surface adjacent to said first and second attachment members when said first and second segments are in said spaced relation.

4. The coupling according to claim 1, further comprising first and second arcuate projections arranged on opposite sides of each of said first and second segments, said first projections extending from said first shoulders on said first and second segments, said second projections extending from said second shoulders of said first and second segments.

5. The coupling according to claim 4, wherein said first arcuate projections have a greater radius of curvature than said second arcuate projections.

6. In combination, a pair of pipe elements and a coupling for joining said pipe elements in end to end relation, said coupling comprising:

first and second segments attached to one another end to end and surrounding a central space, each of said segments having a channel extending circumferentially around and facing said central space, each of said channels being defined by first and second shoulders located on opposite sides of said segments and a back surface extending between said shoulders, each said shoulder comprising a first surface facing said central space and a second surface oriented at an angle with respect to said first surface, said first and second surfaces of said first shoulder meeting at a first cusp, said first and second surfaces of said second shoulder meeting at a second cusp;

a seal positioned within said central space, said seal comprising a ring having first and second lobes positioned on opposite sides thereof;

first and second attachment members positioned at opposite ends of each of said segments attaching said segments to one another, said attachment members being adjustably tightenable for drawing said segments toward one another; wherein contact between said first cusp and said first lobe and said second cusp and said second lobe between said first and second attachment members on each said segment maintaining said first and second segments in spaced relation sufficient to permit insertion of said pipe elements into said central space, said ring being closer to said back surface at points proximate to said first and second attachment members than at points on said segments between and distal to said first and second attachment members.

7. The combination according to claim 6, wherein said first and second lobes contact said second surfaces of said first and second shoulders adjacent to said first and second attachment members when said first and second segments are in said spaced relation.

8. The combination according to claim 7, wherein said ring contacts said back surface adjacent to said first and second attachment members when said first and second segments are in said spaced relation.

9. The combination according to claim 6, further comprising first and second arcuate projections arranged on opposite sides of each of said first and second segments, said first projections extending from said first shoulders on said first and second segments, said second projections extending from said second shoulders of said first and second segments.

10. The combination according to claim 9, wherein said first arcuate projections have a greater radius of curvature than said second arcuate projections.

11. A coupling for joining pipe elements in end to end relation, said coupling comprising:

first and second segments attached to one another end to end and surrounding a central space, each of said segments having a channel extending circumferentially around and facing said central space, each of said channels being defined by first and second shoulders located on opposite sides of said segments and a back surface extending between said shoulders, each said shoulder comprising a first surface facing said central space and a second surface oriented at an angle with respect to said first surface, said first and second surfaces of said first shoulder meeting at a first cusp, said first and second surfaces of said second shoulder meeting at a second cusp;

a seal positioned within said central space, said seal comprising a ring having first and second lobes positioned on opposite sides thereof;

first and second attachment members positioned at opposite ends of each of said segments attaching said segments to one another, at least one of said attachment members being adjustably tightenable for drawing said segments toward one another; wherein contact between said first cusp and said first lobe and said second cusp and said second lobe between said first and second attachment members on each said segment maintaining said first and second segments in spaced relation sufficient to permit insertion of said pipe elements into said central space, said ring being closer to said back surface at points proximate to said first and second attachment members than at points on said segments between and distal to said first and second attachment members.

12. The coupling according to claim 11, wherein said first and second lobes contact said second surfaces of said first and second shoulders adjacent to said first and second attachment members when said first and second segments are in said spaced relation.

13. The coupling according to claim 12, wherein said ring contacts said back surface adjacent to said first and second attachment members when said first and second segments are in said spaced relation.

14. The coupling according to claim 11, further comprising first and second arcuate projections arranged on opposite sides of each of said first and second segments, said first projections extending from said first shoulders on said first and second segments, said second projections extending from said second shoulders of said first and second segments.

15. The coupling according to claim 14, wherein said first arcuate projections have a greater radius of curvature than said second arcuate projections.

16. In combination, a pair of pipe elements and a coupling for joining said pipe elements in end to end relation, said coupling comprising:
- first and second segments attached to one another end to end and surrounding a central space, each of said segments having a channel extending circumferentially around and facing said central space, each of said channels being defined by first and second shoulders located on opposite sides of said segments and a back surface extending between said shoulders, each said shoulder comprising a first surface facing said central space and a second surface oriented at an angle with respect to said first surface, said first and second surfaces of said first shoulder meeting at a first cusp, said first and second surfaces of said second shoulder meeting at a second cusp;
- a seal positioned within said central space, said seal comprising a ring having first and second lobes positioned on opposite sides thereof;
- first and second attachment members positioned at opposite ends of each of said segments attaching said segments to one another, at least one of said attachment members being adjustably tightenable for drawing said segments toward one another; wherein
- contact between said first cusp and said first lobe and said second cusp and said second lobe between said first and second attachment members on each said segment maintaining said first and second segments in spaced relation sufficient to permit insertion of said pipe elements into said central space, said ring being closer to said back surface at points proximate to said first and second attachment members than at points on said segments between and distal to said first and second attachment members.

17. The combination according to claim 16, wherein said first and second lobes contact said second surfaces of said first and second shoulders adjacent to said first and second attachment members when said first and second segments are in said spaced relation.

18. The combination according to claim 17, wherein said ring contacts said back surface adjacent to said first and second attachment members when said first and second segments are in said spaced relation.

19. The combination according to claim 16, further comprising first and second arcuate projections arranged on opposite sides of each of said first and second segments, said first projections extending from said first shoulders on said first and second segments, said second projections extending from said second shoulders of said first and second segments.

20. The combination according to claim 19, wherein said first arcuate projections have a greater radius of curvature than said second arcuate projections.

* * * * *